United States Patent
Huang

(10) Patent No.: US 9,304,637 B2
(45) Date of Patent: Apr. 5, 2016

(54) MUTUAL INDUCTIVE CAPACITIVE TOUCH SCREEN WITH ROUND-SHAPED OR COMB-SHAPED ELECTRODES

(71) Applicant: Shanghai Tianma Micro-Electronics Co., Ltd., Shanghai (CN)

(72) Inventor: Zhongshou Huang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 14/069,250

(22) Filed: Oct. 31, 2013

(65) Prior Publication Data

US 2014/0160368 A1  Jun. 12, 2014

(30) Foreign Application Priority Data

Dec. 11, 2012 (CN) .......................... 2012 1 0533695

(51) Int. Cl.
 *G06F 3/044* (2006.01)
(52) U.S. Cl.
 CPC ...................................... *G06F 3/044* (2013.01)
(58) Field of Classification Search
 CPC ............. H03K 17/962; H03K 17/955; H03K 17/9645; H03K 17/78; H03K 17/9627; H03K 17/941; H03K 17/968; G01D 5/16; G01D 5/24; G01B 11/00; G06K 7/10603; G06F 3/03545–3/03549; G06F 3/041–3/0488; G06F 1/1633–1/03549; G06F 2200/0634; G06F 2200/0339; G06F 2203/04101–2203/04113; G06F 2203/048–2203/04809
 USPC ................................................ 345/173–178
 See application file for complete search history.

(56) References Cited

U.S. PATENT DOCUMENTS

| | | | |
|---|---|---|---|
| 7,202,859 B1* | 4/2007 | Speck et al. ................... | 345/174 |
| 2002/0145588 A1* | 10/2002 | McCahon et al. ............ | 345/156 |
| 2003/0011577 A1* | 1/2003 | Katsuki et al. ................ | 345/173 |
| 2004/0041800 A1* | 3/2004 | Daniels ......................... | 345/204 |
| 2006/0066585 A1* | 3/2006 | Lin ................................ | 345/173 |
| 2007/0008299 A1* | 1/2007 | Hristov ......................... | 345/173 |
| 2009/0085866 A1* | 4/2009 | Sugahara ...................... | 345/156 |
| 2009/0273578 A1* | 11/2009 | Kanda et al. .................. | 345/174 |
| 2010/0165280 A1* | 7/2010 | Ishitani et al. ................ | 349/141 |
| 2012/0038585 A1* | 2/2012 | Kim .............................. | 345/174 |

(Continued)

FOREIGN PATENT DOCUMENTS

| | | |
|---|---|---|
| CN | 1761155 A | 4/2006 |
| CN | 101727228 A | 6/2010 |

(Continued)

OTHER PUBLICATIONS

Office Action as received in corresponding Chinese Application No. 201210553695M, dated Jul. 1, 2015.

*Primary Examiner* — Sanghyuk Park
(74) *Attorney, Agent, or Firm* — Alston & Bird LLP

(57) ABSTRACT

A mutual inductive capacitive touch screen is disclosed. The screen includes a plurality of drive lines, a plurality of sense lines and an electrode structure including a plurality of first electrodes and a plurality of second electrodes. The first electrodes are connected with the drive lines of the touch screen and the second electrodes are connected with the sense lines of the touch screen, or the first electrodes are connected with the sense lines of the touch screen and the second electrodes are connected with the drive lines of the touch screen. In addition, the electrode structure has an isotropic detection characteristic.

12 Claims, 3 Drawing Sheets

(56) References Cited

U.S. PATENT DOCUMENTS

| | | | |
|---|---|---|---|
| 2012/0227259 A1* | 9/2012 | Badaye et al. | 29/846 |
| 2012/0327005 A1* | 12/2012 | Hamada et al. | 345/173 |
| 2013/0278542 A1* | 10/2013 | Stephanou et al. | 345/174 |
| 2013/0335684 A1* | 12/2013 | Yoshikawa et al. | 349/96 |
| 2014/0022202 A1* | 1/2014 | Badaye et al. | 345/174 |
| 2014/0192027 A1* | 7/2014 | Ksondzyk et al. | 345/178 |

FOREIGN PATENT DOCUMENTS

| | | |
|---|---|---|
| CN | 102541369 A | 7/2012 |
| JP | 4821544 B2 | 11/2011 |

\* cited by examiner

MUTUAL INDUCTIVE CAPACITIVE TOUCH SCREEN WITH ROUND-SHAPED OR COMB-SHAPED ELECTRODES

CROSS-REFERENCES TO RELATED APPLICATIONS

The present application claims priority to Chinese patent application No. 201210533695.0, entitled "MUTUAL INDUCTIVE CAPACITIVE TOUCH SCREEN", filed with the State Intellectual Property Office of People's Republic of China on Dec. 11, 2012, the contents of which are incorporated herein by reference in their entirety.

FIELD

The present invention relates to a mutual inductive capacitive touch screen and particularly to an electrode structure of a mutual inductive capacitive touch screen.

BACKGROUND OF THE INVENTION

Capacitive touch screens can be categorized as self-inductive capacitive touch screens and mutual inductive capacitive touch screens according to their detection modes for a touch signal. A mutual inductive capacitive touch screen comprises a plurality of drive lines and a plurality of sense lines intersecting orthogonally with the drive lines. Mutual inductive capacitances are formed between the plurality of drive lines and the plurality of sense lines, where the capacitances at the locations where the plurality of drive lines and the plurality of sense lines overlap are unchangeable by an outside touching object, and the mutual inductive capacitances resulting from fringe electric fields generated at the locations where no electrodes overlap are influenced by an outside touching object.

FIG. 1 is an electrode structure of a typical mutual inductive capacitive touch screen in the prior art. A space between two diamond-shaped electrodes determines the capacitance of a mutual inductive capacitance C and also the maximal amplitude of a signal. This is because the mutual inductive capacitance varies when a finger is pressed against the surface of the touch screen while a press trace of the a finger covers a part of area or all area of a gap region of the mutual inductive capacitance, and variation of signal output by the plurality of sense lines is proportionate to variation of mutual inductive capacitance.

FIG. 2 illustrates a shape of press trace of a finger, movement directions of the finger and shape of a gap region of a mutual inductive capacitance, where there are two directions D1 and D2 in which the finger may move. When the finger moves in different direction respectively denoted by D1 or D2, variation of the mutual inductive capacitance C (see FIG. 1) exhibit different variation curves. As illustrated in FIG. 3, a variation curve L1 and a variation curve L2 can be calculated from the mutual inductive capacitance C with the electrode structure illustrated in FIG. 1 and the respective directions D1 and D2 in which the finger moves as illustrated in FIG. 2. The variation curve L1 and the variation curve L2 correspond respectively to the movement directions D1 and D2 , and K represents time or distance of the finger movement. We notice that firstly the electrode structure of a touch screen as illustrated in FIG. 1 results in an anisotropic detection characteristic and secondly the variation curves of the mutual inductive capacitance are unsmooth. This will cause noise in temporal or spatial differentiation of the output signal, thus degrading a resolution of the touch signal at high spatial frequencies and temporal frequencies.

BRIEF SUMMARY OF THE INVENTION

One inventive aspect is a mutual inductive capacitive touch screen. The touch screen includes a plurality of drive lines, a plurality of sense lines, and an electrode structure. The electrode structure includes a plurality of first electrodes, and a plurality of second electrodes, where either the first electrodes are connected with the drive lines of the touch screen and the second electrodes are connected with the sense lines of the touch screen, or the first electrodes are connected with the sense lines of the touch screen and the second electrodes are connected with the drive lines of the touch screen. In addition, the electrode structure has an isotropic detection characteristic.

DETAILED DESCRIPTION OF THE INVENTION

Implementations of embodiments of the invention will be described below in details with reference to the drawings.

In a first embodiment of the invention, a mutual inductive capacitive touch screen comprises a plurality of drive lines, a plurality of sense lines and an electrode structure. The electrode structure comprises a plurality of first electrodes and a plurality of second electrodes, where the first electrodes are connected with the drive lines of the touch screen and the second electrodes are connected with the sense lines of the touch screen, or the first electrodes are connected with the sense lines of the touch screen and the second electrodes are connected with the drive lines of the touch screen. The electrode structure has an isotropic detection characteristic.

Figure 4:
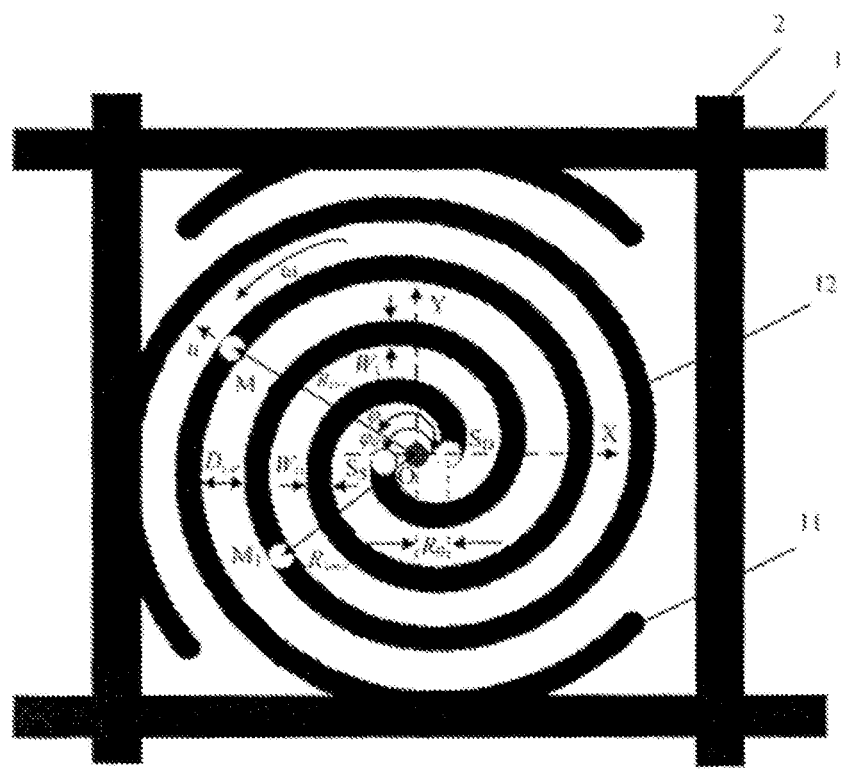
FIG. 4 is a schematic diagram of a connection relationship among an annular electrode structure and drive lines and sense lines according to a first embodiment of the invention.

In a preferred embodiment, the electrode structure is an annular electrode structure, and its connection with the drive lines and sense lines is illustrated in FIG. 4, where there are two drive lines 1, two sense lines 2, a first electrode 11 and a second electrode 12. It should be noted that, in FIG. 4, there only illustrates a region surrounded by adjacent two drive lines of the plurality drive lines and adjacent two sense lines of the plurality of sense lines for a clear illustration. Patterns of the first electrode 11 and the second electrode 12 are both open spiral curves, and the open spiral curve of the first electrode 11 and the open spiral curve of the second electrode 12 are wound around each other at a fixed gap spacing. The first electrode 11 is connected with one of the drive lines 1, and the second electrode 12 is connected with the one of the sense lines 2. The spiral curve of the first electrode 11 is a curve meeting the following Formula 1:

$$R_{Drive} = \frac{u}{\omega} \cdot \varphi + R_0 \quad (1)$$

Wherein, $R_{Drive}$ is a radius of a moving point M on the spiral curve of the first electrode 11 to a center O of the spiral curve of the first electrode 11, $R_0$ is the distance between a starting point $S_D$ of the spiral curve and the center O, u is a speed at which the moving point M moves outward in the radius direction, $\omega$ is an angular speed at which the moving point M rotates around the center O, and $\varphi$ is the angle calculated from forward direction of a X axis of a coordinate system to a straight line determined by the moving point M and an origin of the coordinate system, and here the origin of the coordinate system is the center O.

In a preferred embodiment, the spiral curve of the second electrode 12 meets the following Formula 2:

$$R_{Sense} = \frac{u}{\omega} \cdot (\varphi + \varphi_0) + R_0 - D_{gap} \quad (2)$$

Wherein, $R_{Sense}$ is a radius of a moving point $M_1$ on the spiral curve of the second electrode 12 to the center O of the spiral curve of the second electrode 12, $\varphi_0$ is an initial phase difference between a starting point $S_S$ of the spiral curve of the second electrode 12 and a starting point $S_D$ of the spiral curve of the first electrode 11, and preferably $\varphi_0$ may be positive or negative, and $D_{gap}$ is a gap distance between the spiral curve of the first electrode 11 and the spiral curve of the second electrode 12. The same marks in Formula 2 as in Formula 1 have the same physical meanings, and corresponding reference can be made to Formula 1, so a repeated description will be omitted here.

Preferably the gap distance $D_{gap}$ between the spiral curve of the first electrode 11 and the spiral curve of the second electrode 12 meets the following Formula 3:

$$D_{gap} \geq 0.5 \cdot (W_D + W_S) + D_{Lith} \quad (3)$$

Wherein, $W_D$ is the line width of the spiral curve of the first electrode 11, $W_S$ is the line width of the spiral curve of the second electrode 12, and $D_{Lith}$ is a preset minimum gap distance between the spiral curve of the first electrode 11 and the annular curve of the second electrode 12. In a practical application, $D_{Lith}$ can be a minimum electrode gap attainable in a process to avoid the spiral curved electrodes from intersecting or overlapping itself.

In a further preferred embodiment, the spiral curve of the first electrode 11 further comprises a segment of a curve meeting the Formula 1 described above for the spiral curve of the first electrode 11, and the segment is at a gap distance $D_{gap}$ away from the spiral curve of the second electrode 12.

Figure 2:
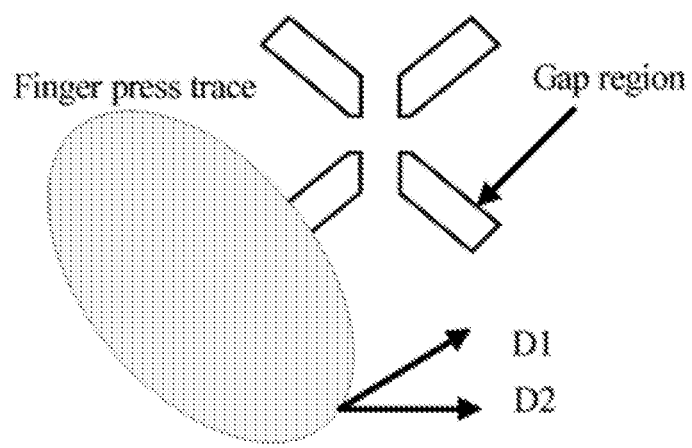
FIG. 2 illustrates shape of press trace of a finger, movement directions of the finger and shape of a gap region of a mutual inductive capacitance in the prior art.
Figure 3:
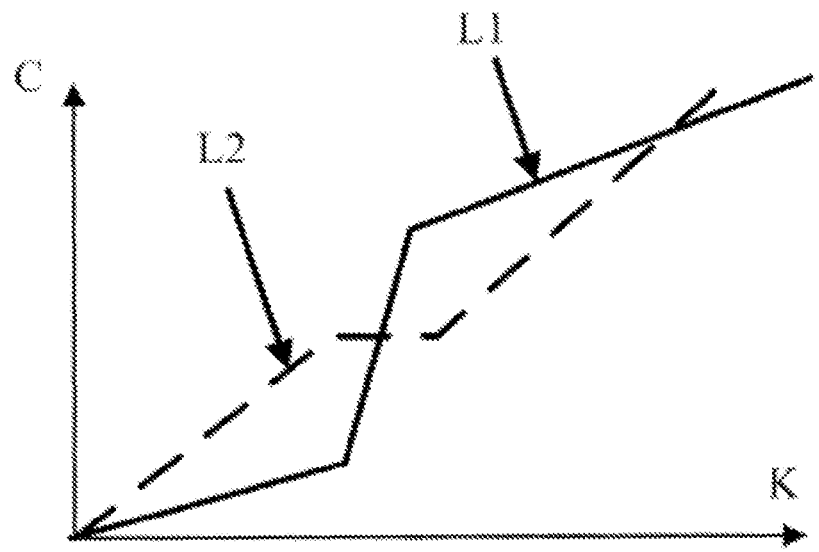
FIG. 3 is variation curves calculated from mutual inductive capacitance between electrodes along with movement of a finger in the prior art.
Figure 5:
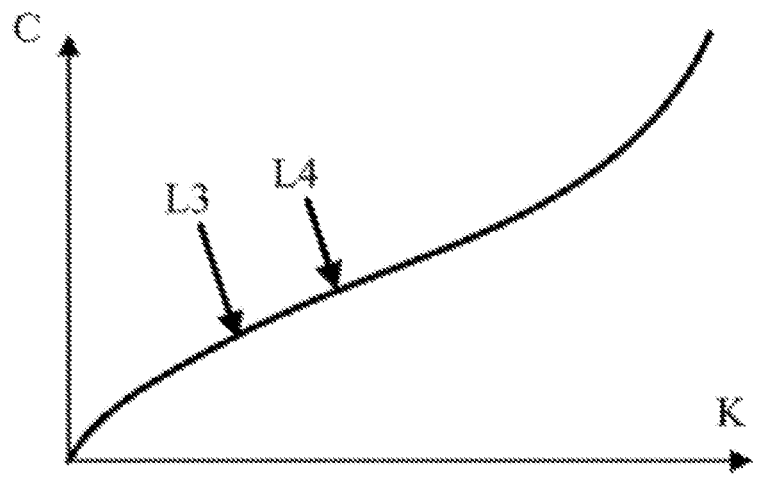
FIG. 5 is a variation curve calculated from a mutual inductive capacitance of the annular electrode structure along with movement of a finger according to the first embodiment of the invention.

FIG. 5 is a variation curve of a mutual inductive capacitance, calculated from the spiral electrode structure illustrated in FIG. 4 and the movement directions of a finger illustrated in FIG. 2, along with the movement of the finger according to the first embodiment of the invention, wherein K represents time or distance of the finger movement, variation curves of the mutual inductive capacitance C with respect to variation of K, respectively in the movement direction D1 and the movement direction D2 as illustrated in FIG. 2, are respectively like a variation curve L3 and a variation curve L4 as illustrated in FIG. 5, where L3 and L4 are illustrated overlapping. We can know from this that a variation of the mutual inductive capacitance C exhibits an isotropic characteristic instead of an anisotropic characteristic along with different movement directions of a finger, and the variation curve is also relatively smooth, so more precise information can be drew from a touch signal.

Figure 1:
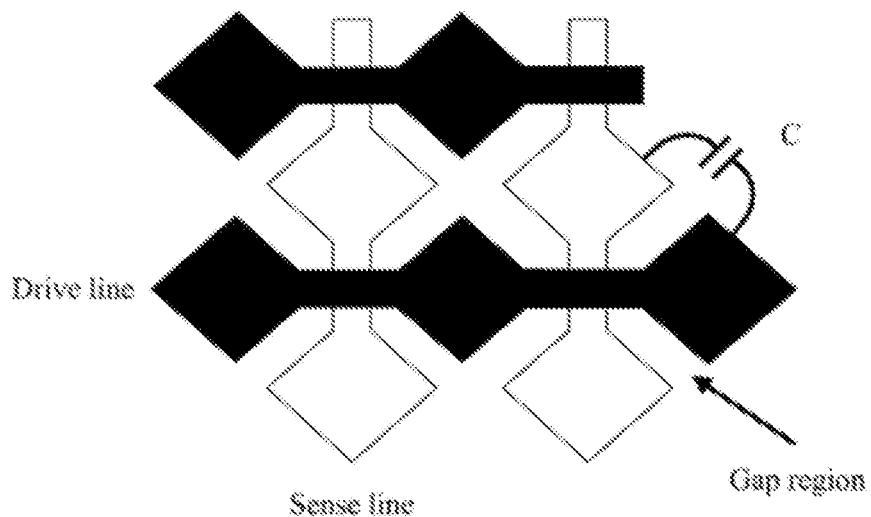
FIG. 1 is an electrode structure of a mutual inductive capacitive touch screen in the prior art.

It shall be further noted that the electrode structure in the prior art as illustrated in FIG. 1 has a majority of area occupied by solid electrodes and only gap regions between any two of four diamond-shaped electrodes actually contributed to variation of the mutual inductive capacitance. In contrast, the electrode structure as illustrated in FIG. 4 according to the first embodiment of the invention has the majority of the area between the sense lines and the drive lines populated by the gap regions between drive electrodes and sense electrodes. That is, a high mutual inductive capacitance per unit area can be achieved with a higher sensitivity to a touch than that of the electrode structure as illustrated in FIG. 1.

Figure 6:
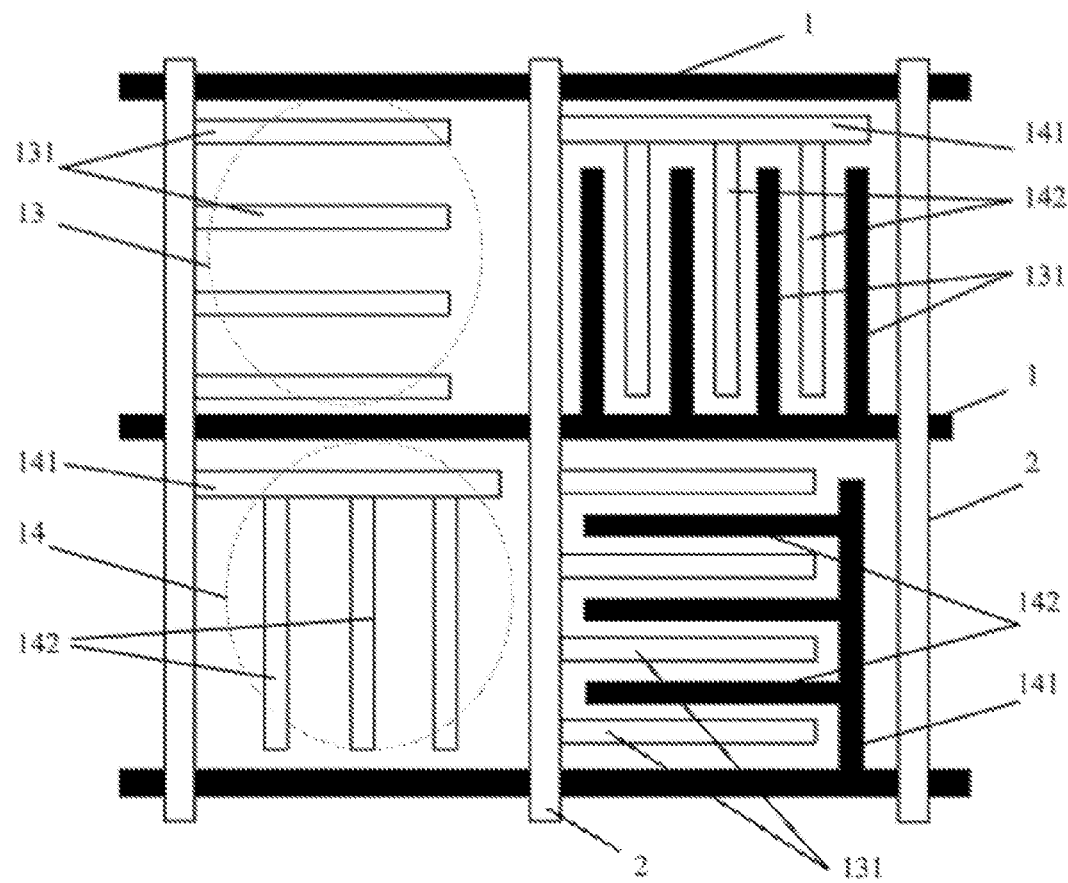
FIG. 6 is a schematic diagram of a connection relationship among an electrode structure composed of a plurality of straight lines and drive lines and sense lines according to a second embodiment of the invention.

FIG. 6 illustrates an electrode structure comprising a plurality of straight-line electrodes according to a second embodiment of the invention. A first electrode 13 includes at least one first straight line 131 connected directly to one of drive lines 1 or one of sense lines 2, and the at least one first straight line 131 is perpendicular to the one drive line 1 or the one sense line 2 connected.

A second electrode 14 includes an extended straight line 141 and at least one second straight line 142 of which one end is connected to the extended straight line 141. The extended straight line 141 is connected at one end to one of drive lines 1 or one of sense lines 2 and is perpendicular to the one of drive lines 1 or the one of sense lines 2 connected. The second straight line 142 is perpendicular to the extended straight line 141.

The at least one first straight line 131 does not intersect with the extended straight line 141 or the at least one second straight line 142, and the at least one first straight line 131 and the at least one second straight line 142 are arranged alternately and in parallel to each other at a fixed gap.

In a preferred embodiment, several of the first electrodes 13 and second electrodes 14 connected to each drive line 1 or each sense line 2 are arranged alternately.

In a preferred embodiment, the at least one first straight line 131 in one pixel is arranged perpendicularly to that in adjacent pixel in horizontal or vertical direction.

In the electrode structure illustrated in FIG. 6, each drive electrode or sense electrode comprises a plurality of horizontal or vertical straight lines of electrode. The direction of the gap contributing to variation of the mutual inductive capacitances in each pixel of the touch screen is different from that in adjacent pixel either in horizontal direction or in vertical direction by an angle of 90 degrees.

Although all the gaps are arranged in the same direction in a pixel, all the gaps contributing to variation of the mutual inductive capacitances are avoided from being arranged in the same direction throughout the touch screen. The touch signal gained by sliding across more than two pixels' distance in both the horizontal and vertical directions is substantially isotropic and has a similar variation curves (see FIG. 5) to that of the electrode structure illustrated in FIG. 4, so a repeated description thereof will be omitted here.

Moreover the majority of the area between the sense lines and the drive lines is populated by the gap regions of the drive electrodes and sense electrodes, thus improving the sensitivity greatly.

The embodiments of the invention have at least the following advantageous effects: the majority of the area between the sense lines and the drive lines is populated by the structure of spiral curved electrodes or multiple straight-line electrodes so that the electrode structure has an isotropic detection characteristic and there has a smooth variation curve of a mutual inductive capacitance between electrodes to thereby improve sensitivity of detecting a touch signal and resolution of a resulting touch signal.

Those skilled in the art can make various modifications and variations to the invention without departing from the spirit and scope of the invention. Thus the invention is also intended to encompass these modifications and variations.

What is claimed is:

1. A mutual inductive capacitive touch screen, comprising:
   a plurality of drive lines;
   a plurality of sense lines; and
   an electrode structure comprising:
   a plurality of first electrodes connected to the drive lines, and
   a plurality of second electrodes connected to the sense lines,
   wherein the first electrodes and the second electrodes are round-shaped spiral curves, and one of the first electrodes and one of the second electrodes are wound around each other with a fixed spacing;
   wherein the spiral curve of the first electrodes meets a formula of:

$$R_{Drive} = \frac{u}{\omega} \cdot \varphi + R_0,$$

wherein, $R_{Drive}$ is a radius of a moving point on the spiral curve of the first electrode to a center of the spiral curve of the first electrode, $R_0$ is a distance between a starting point of the spiral curve of the first electrode and the center, u is a speed at which the moving point moves outward in the radius direction, $\omega$ is an angular speed at which the moving point rotates around the center, and $\phi$ is an angle calculated from forward direction of an X axis of a coordinate system to a straight line determined by the moving point and an origin of the coordinate system.

2. The mutual inductive capacitive touch screen according to claim 1, wherein the electrode structure has an isotropic detection characteristic.

3. The mutual inductive capacitive touch screen according to claim 1, wherein the first electrodes are directly connected with the drive lines, and the second electrodes are directly connected with the sense lines.

4. The mutual inductive capacitive touch screen according to claim 1, wherein the spiral curve of the second electrodes meets a formula of:

$$R_{Sense} = \frac{u}{\omega} \cdot (\varphi + \varphi_0) + R_0 - D_{gap},$$

wherein $R_{sense}$ is a radius of a moving point on the spiral curve of the second electrode to the center of the spiral curve of the second electrode, $\Phi_0$ is an initial phase difference between a starting point of the spiral curve of the second electrode and a starting point of the annular curve of the first electrode, and $D_{gap}$ is a gap distance between the spiral curve of the first electrode and the spiral curve of the second electrode.

5. The mutual inductive capacitive touch screen according to claim 4, wherein the gap distance $D_{gap}$ between the spiral curve of the first electrode and the spiral curve of the second electrode meets a formula of:

$$D_{gap} \geq 0.5 \cdot (W_D + W_s) + D_{Lith},$$

wherein $W_D$ is a line width of the annular curve of the first electrode, $W_s$ is a line width of the spiral curve of the second electrode, and $D_{Lith}$ is a preset minimum gap distance between the spiral curve of the first electrode and the spiral curve of the second electrode.

6. The mutual inductive capacitive touch screen according to claim 5, wherein the spiral curve of the first electrode further comprises a segment at a gap distance $D_{gap}$ away from the spiral curve of the second electrode.

7. A mutual inductive capacitive touch screen, comprising:
   a plurality of drive lines;
   a plurality of sense lines; and
   an electrode structure comprising:
   a plurality of first electrodes connected to the drive lines, and a plurality of second electrodes connected to the sense lines, wherein each of the plurality of first electrodes comprises at least one first straight line structure and a first comb structure, each of the plurality of second electrodes comprises at least one second straight line structure and a second comb structure, the at least one first straight line structure is included in the second comb structure with a fixed spacing, and the at least one second straight line structure is included in the first comb structure with a fixed spacing.

8. The mutual inductive capacitive touch screen according to claim 7, wherein the electrode structure has an isotropic detection characteristic.

9. The mutual inductive capacitive touch screen according to claim 7, wherein the plurality of first electrodes are directly connected to the drive lines, and the plurality of second electrodes are directly connected to the sense lines.

10. The mutual inductive capacitive touch screen according to claim 9, wherein the first comb structure comprises a first end and at least one first branch, and the at least one first branch is perpendicular to the first end, and wherein the second comb structure comprises a second end and at least one second branch, and the at least one second branch is perpendicular to the second end.

11. The mutual inductive capacitive touch screen according to claim 10, wherein the second branch is parallel to the first straight line structure with a fixed spacing, and the first branch is parallel to the second straight line structure with a fixed spacing.

12. The mutual inductive capacitive touch screen according to claim 11, wherein the first end is parallel to the first straight line structure, and the second end is parallel to the second straight line structure.

* * * * *